US012681688B2

(12) United States Patent
Ishizuka

(10) Patent No.: US 12,681,688 B2
(45) Date of Patent: Jul. 14, 2026

(54) AUDIO DEVICE, METHOD OF CONTROLLING AUDIO DEVICE, AND SOUND PROCESSING SYSTEM

(71) Applicant: YAMAHA CORPORATION, Hamamatsu (JP)

(72) Inventor: Kenji Ishizuka, Hamamatsu (JP)

(73) Assignee: YAMAHA CORPORATION, Hamamatsu (JP)

( * ) Notice: Subject to any disclaimer, the term of this patent is extended or adjusted under 35 U.S.C. 154(b) by 257 days.

(21) Appl. No.: 18/172,114

(22) Filed: Feb. 21, 2023

(65) Prior Publication Data

US 2023/0289136 A1 Sep. 14, 2023

(30) Foreign Application Priority Data

Mar. 8, 2022 (JP) ................................. 2022-035113

(51) Int. Cl.
*G06F 3/16* (2006.01)

(52) U.S. Cl.
CPC .............. *G06F 3/167* (2013.01); *G06F 3/162* (2013.01)

(58) Field of Classification Search
CPC .......... G06F 3/167; G06F 3/162; G06F 3/165
USPC ......................... 381/56, 58–59, 74, 118–119
See application file for complete search history.

(56) References Cited

U.S. PATENT DOCUMENTS

| | | | |
|---|---|---|---|
| 2002/0007717 A1 | 1/2002 | Uehara | |
| 2007/0053529 A1 | 3/2007 | Suyama et al. | |
| 2007/0143120 A1 | 6/2007 | Phadnis et al. | |
| 2019/0222332 A1 | 7/2019 | Okabayashi | |
| 2020/0174735 A1* | 6/2020 | Gomes | G06F 3/165 |
| 2021/0096812 A1* | 4/2021 | Dennis | G06F 3/165 |

FOREIGN PATENT DOCUMENTS

| | | |
|---|---|---|
| CN | 1929350 A | 3/2007 |
| CN | 101336404 A | 12/2008 |
| CN | 106095132 A | 11/2016 |
| CN | 106936988 A | 7/2017 |
| CN | 109565631 A | 4/2019 |
| CN | 212966145 U | 4/2021 |
| JP | 2002007014 A | 1/2002 |
| JP | 2007074094 A | 3/2007 |
| JP | 2013197764 A | 9/2013 |
| JP | 2016075766 A | 5/2016 |

OTHER PUBLICATIONS

Office Action issued in Chinese Appln. No. 202310208991.1, mailed Sep. 27, 2024. English machine translation provided.
Office Action issued in Chinese Appln. No. 202310208991.1 mailed Feb. 5, 2025.

(Continued)

*Primary Examiner* — George C Monikang

(74) *Attorney, Agent, or Firm* — ROSSI, KIMMS & McDOWELL LLP

(57) ABSTRACT

A method of controlling an audio device identifies an external user of the audio device by communicating with an information processing apparatus, receives, by the audio device, setting information of the audio device corresponding to the identified external user, and controls the audio device based on the received setting information of the audio device.

16 Claims, 8 Drawing Sheets

(56)                    References Cited

OTHER PUBLICATIONS

Office Action issued in Chinese Appln. No. 202310208991.1 mailed Jun. 20, 2025.

Notice of Reasons for Refusal issued in Japanese Appln. No. 2022-035113 mailed Sep. 30, 2025. English machine translation provided.

Notice of Reasons for Refusal issued in Japanese Appln. No. 2022-035113, mailed Feb. 17, 2026. English machine translation provided.

* cited by examiner

|  | PREFERENCE SETTING | UD SETTING | USER LEVEL SETTING |
|---|---|---|---|
| ADMINISTRATOR | Available | Available | Available |
| NORMAL USER | Available | Available | N/A |
| GUEST USER | Available | N/A | N/A |

FIG.6

AUDIO DEVICE, METHOD OF CONTROLLING AUDIO DEVICE, AND SOUND PROCESSING SYSTEM

CROSS REFERENCE TO RELATED APPLICATIONS

This Nonprovisional application claims priority under 35 U.S.C. § 119(a) on Patent Application No. 2022-035113 filed in Japan on Mar. 8, 2022, the entire contents of which are hereby incorporated by reference.

BACKGROUND

Technical Field

An embodiment of the present disclosure relates to an audio device, a method of controlling the audio device, and a sound processing system.

Background Information

Japanese Unexamined Patent Application Publication No. 2002-7014 discloses an automatic player piano that changes a GUI for each user. The automatic player piano disclosed in Japanese Unexamined Patent Application Publication No. 2002-7014 recognizes a user by voice recognition, and makes a change to a GUI corresponding for each recognized user.

Japanese Unexamined Patent Application Publication No. 2002-7014 stores setting information of a user, in the automatic player piano. Therefore, when the user uses another audio device in another venue, for example, the setting of the user is not able to be reflected.

SUMMARY

An embodiment of the present disclosure is directed to provide a method of controlling an audio device capable of reflecting a setting of each individual even when any audio device at any venue is used.

A method of controlling an audio device according to an embodiment of the present disclosure identifies an external user of the audio device by communicating with an information processing apparatus, receives, by the audio device, setting information of the audio device corresponding to the identified external user, and controls the audio device based on the received setting information of the audio device.

According to an embodiment of the present disclosure, a setting of each individual is able to be reflected even when any audio device at any venue is used.

BRIEF DESCRIPTION OF THE DRAWINGS

FIG. 6 is a view showing an example of authority of each user.

DETAILED DESCRIPTION

Figure 1:
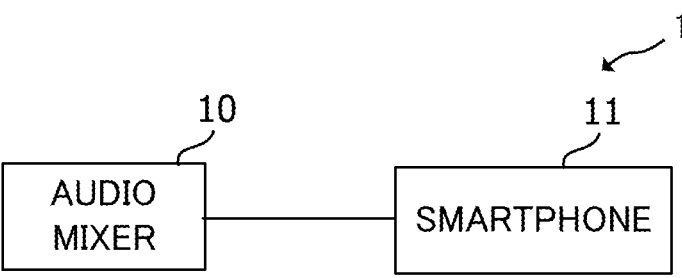
FIG. 1 is a block diagram showing a configuration of a sound processing system.
Figure 2:
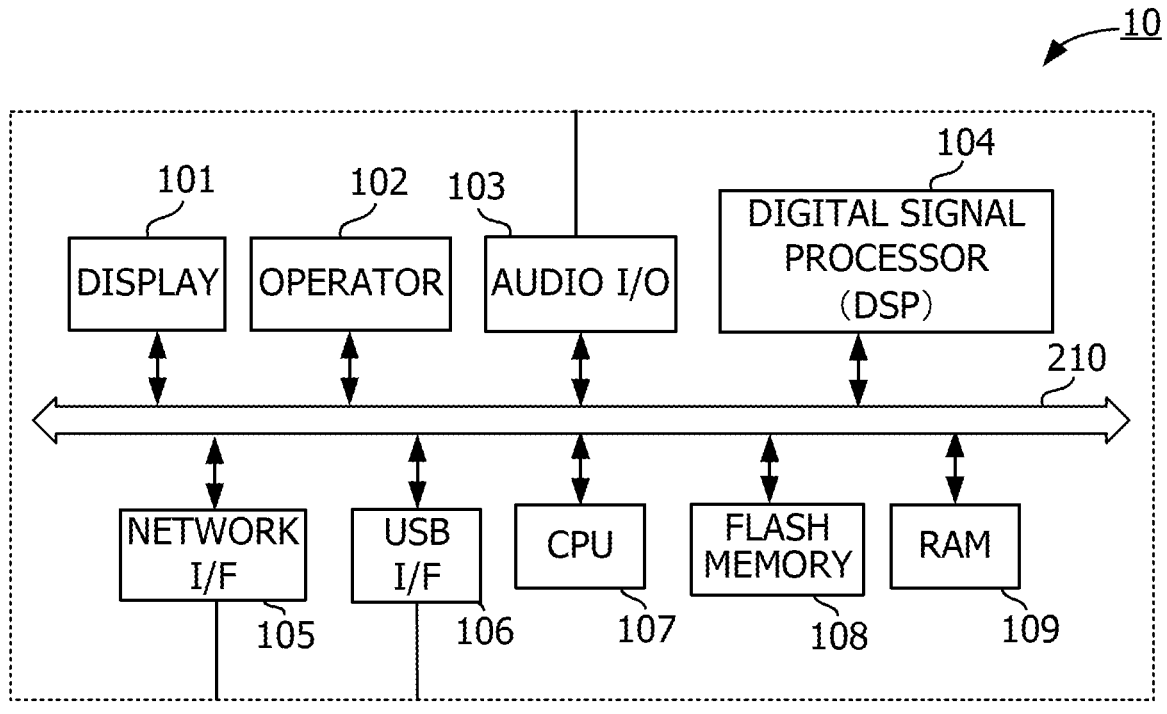
FIG. 2 is a block diagram showing a hardware configuration of an audio mixer.
Figure 3:
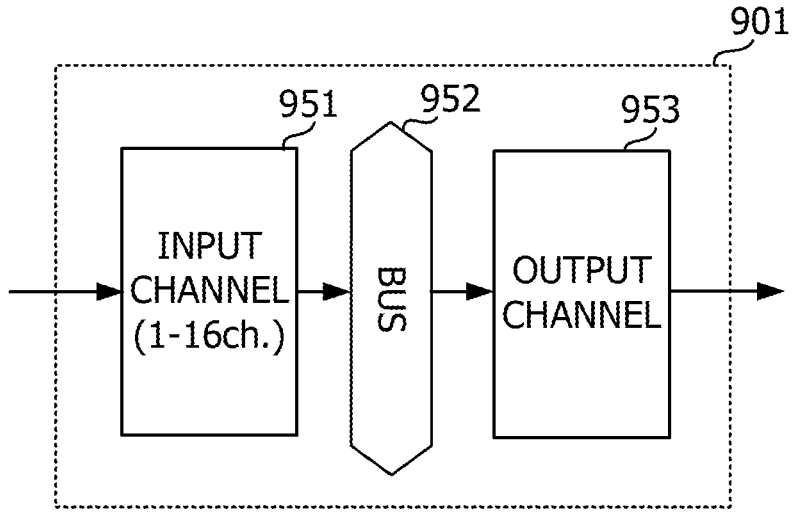
FIG. 3 is a view showing a functional configuration of a signal processing block.
Figure 4:
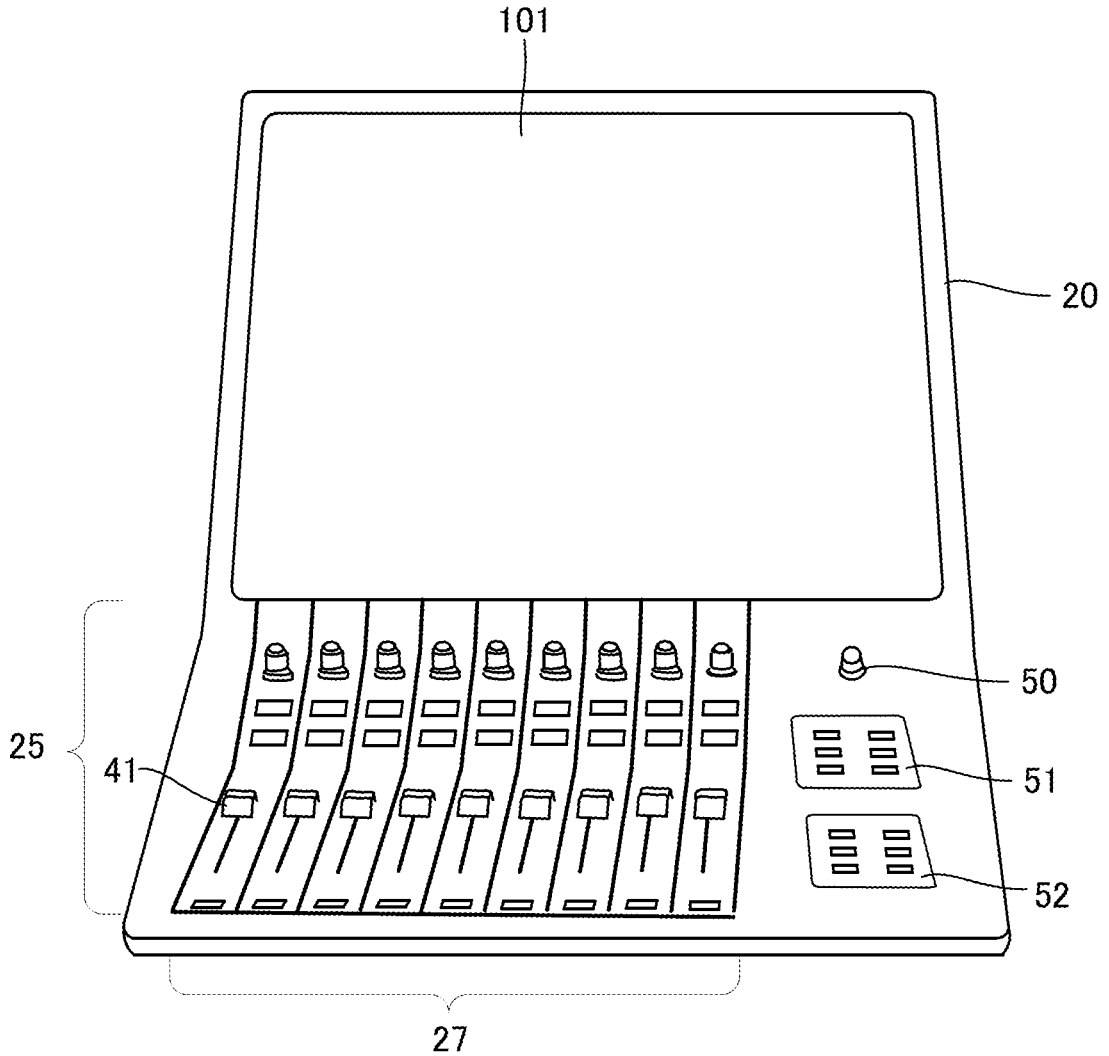
FIG. 4 is a front perspective view of the audio mixer.

FIG. 1 is a block diagram showing a configuration of a sound processing system 1. FIG. 2 is a block diagram showing a hardware configuration of an audio mixer 10. FIG. 3 is a view showing a functional configuration of a signal processing block of the audio mixer 10. FIG. 4 is a front perspective view of the audio mixer 10.

As shown in FIG. 1, the sound processing system 1 includes an audio mixer 10 and a smartphone 11 to be connected to the audio mixer 10. The audio mixer 10 and the smartphone 11 are connected, for example, by a USB (Universal Serial Bus) cable or by a wireless network such as Wi-Fi (registered trademark) or Bluetooth (registered trademark).

The audio mixer 10 is an example of an audio device of the present disclosure. The audio mixer 10 receives an input of an audio signal from another audio device such as a microphone, or outputs an audio signal to another audio device such as a speaker.

The audio mixer 10 receives an input of an audio signal from an audio device such as a microphone. The audio mixer 10 performs signal processing such as mixing processing or effect processing, on an inputted audio signal. The audio mixer 10 sends the audio signal on which the signal processing has been performed, to an audio device such as a speaker.

The audio mixer 10, as shown in FIG. 2, includes a display 101, an operator 102, an audio I/O (Input/Output) 103, a digital signal processor (DSP) 104, a network I/F (interface) 105, a USB I/F 106, a CPU 107, a flash memory 108, and a RAM 109. These components are connected to each other through a bus 210.

As shown in FIG. 4, the audio mixer 10 includes a housing 20. The display 101 is disposed at a front upper portion of the housing 20. An operation panel 25 is disposed at a front lower portion of the housing 20. On the operation panel 25, a channel strip section 27, a user-defined knob 50, a fader bank area 51, and a user-defined key area 52 are disposed.

The channel strip section 27 includes eight input channel sections and one master section, as an example. A plurality of physical controls including a fader 41 are disposed at each channel section. A user operates the fader 41 and adjusts the level of each input channel and master output.

The user-defined knob 50 is a knob to which any function is able to be assigned. The user can assign any function to the user-defined knob 50. In addition, the user, by operating the user-defined knob 50, can adjust a value of a parameter of an assigned function.

In the fader bank area 51, a plurality of switches to designate a channel being assigned to eight input channel sections in the channel strip section 27 are placed. For example, when the user presses a switch displayed as "1-8," input channels 1 to 8 are assigned to the eight input channel sections. In addition, in the fader bank area 51, a switch displayed, for example, as "CUSTOM" is disposed as a switch of a custom fader bank. The custom fader bank is a function that assigns any channel to the fader 41. When the user presses the "CUSTOM" switch, any input channel that the user designated is assigned to each of the eight input channel sections.

The user-defined key area 52 is provided with a plurality of user-defined keys. The user assigns any function to the plurality of user-defined keys. The user, by pressing any of the plurality of user-defined keys disposed in the user-defined key area 52, can execute any function assigned to a pressed user-defined key.

The CPU 107 controls the operation of the audio mixer 10. The CPU 107 reads and executes a program stored in the flash memory 108 being a storage medium to the RAM 109 and performs various types of operations. It is to be noted that the program does not need to be stored in the flash memory 108 of the own device. For example, the program may be downloaded each time from another device such as a server and may be read out to the RAM 109.

The CPU 107 performs display control of the display 101, input and output of an audio signal in the audio I/O 103, control of mixing processing in the digital signal processor 104, control of effect processing, a change in a value of a parameter related to various controls, and the like.

The display 101 includes an LCD (Liquid Crystal Display) or an OLED (Organic Light-Emitting Diode), for example, and displays various types of information according to the control of the CPU 107. The operator 102 receives an operation to the audio mixer 10, from a user. The operator 102 is configured by various physical controls. In addition, the operator 102 may be configured by a touch panel stacked on the display 101.

Figure 5:
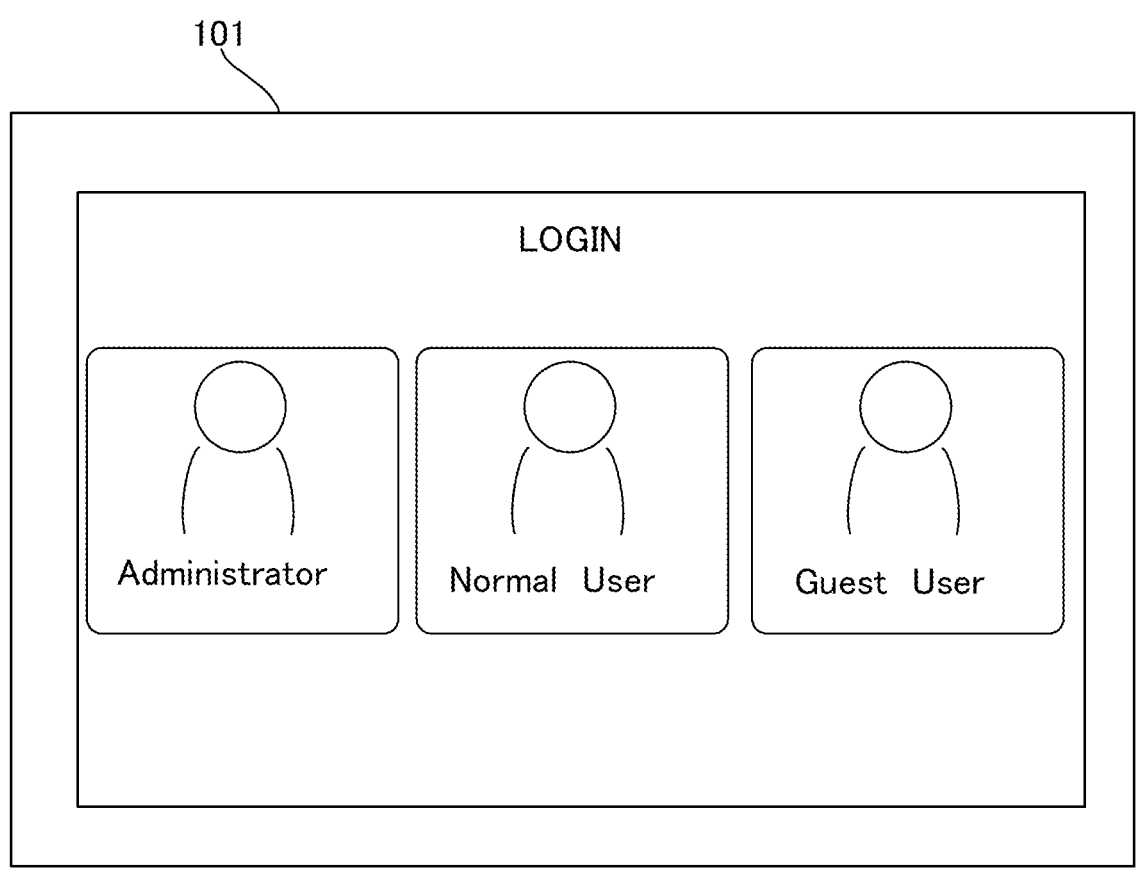
FIG. 5 is a view showing an example of a LOGIN screen.

The CPU 107, at startup of the audio mixer 10 or at any timing (timing at which a specific operation is performed on the operator 102, for example), displays a LOGIN screen as shown in FIG. 5. FIG. 5 is a view showing an example of the LOGIN screen.

The CPU 107, on the LOGIN screen, displays a selection screen to select an administrator, a normal user, or a guest user. The user selects any of an administrator, a normal user, and a guest user. The CPU 107, when the administrator or the normal user is selected, identifies a user by an input of a user ID and a password. The identification of a user may be performed by biometrics such as a fingerprint, an iris, or a face. The CPU 107 allows an identified administrator or normal user to log in. It is to be noted that a guest user does not need authentication such as a password input. Even when the administrator or the normal user is selected, when the identification of a user is unable to be performed, the user may log in as a guest user.

FIG. 6 shows an example of authority of each user. The administrator is a user who can execute all operations to the audio mixer 10. The normal user and the guest user are users who are restricted to some operations. FIG. 6 shows a preference setting, a setting of UD (User Defined), and a user level setting, as an example of user authority.

A change in the preference setting is allowed to all the users. The preference setting is a setting related to an operating environment. All the users can set the operating environment according to a preference. The preference setting includes a color of the GUI to be displayed on the display 101, brightness of the display 101, a language to be displayed on the display 101, an ascending order or a descending order of items to be displayed, and presence of an error display to a specific operation, for example.

The normal user is restricted only to the user level setting. The user level setting is an operation to designate a user as a normal user or an administrator for each user ID. The administrator can designate other user IDs as either a normal user or an administrator.

The guest user is restricted from operating the user level setting and the UD setting. The UD setting includes assignment of a function by the user-defined knob 50, assignment of an input channel by the custom fader bank, and assignment of a function to a switch of the user-defined key area 52. The administrator and the normal user can perform an operation of the assignment of a function by the user-defined knob 50, the assignment of an input channel by the custom fader bank, and the assignment of a function to a switch of the user-defined key area 52.

In addition, the preference setting and the UD setting are stored in the flash memory 108, as setting information for each user ID. In short, the setting information includes information (information to designate a function to be assigned to a physical control of the audio device) on the preference setting or the UD setting. The CPU 107 reads out the setting information corresponding to a logged-in user ID from the flash memory 108, and controls the audio mixer 10. As a result, the user can reproduce the preference setting or the UD setting in the past.

The digital signal processor 104 is configured by a plurality of DSPs (Digital Signal Processors) for performing various types of signal processing such as mixing processing or effect processing of audio signals. The digital signal processor 104 performs signal processing such as mixing processing or effect processing on an audio signal inputted from the audio I/O 103 or the network I/F 105. The digital signal processor 104 outputs the audio signal on which signal processing has been performed, through the audio I/O 103 or the network I/F 105.

As shown in FIG. 3, the signal processing block 901 is configured by an input channel 951, a bus 952, and an output channel 953. In this example, the input channel 951 has 16 (1-16) channels. The bus 952 has various types of buses such as a stereo bus, a MIX bus, and a MATRIX bus. The output channel 953 is a block that processes the audio signal that has been sent out from each bus.

Each channel of the input channel 951 performs effect processing such as an equalizer (EQ) or a compressor (COMP) on an inputted audio signal. Each channel in the input channel 951 sends out the audio signal on which the signal processing has been performed, to the bus 952 provided in the subsequent stage. The level of the audio signal that the input channel 951 sends out is adjusted by a physical control of the fader 41 or the like.

The bus 952 mixes audio signals sent out from each input channel, and outputs the audio signal to the output channel 953.

The output channel 953 performs effect processing such as an equalizer or a compressor on an inputted audio signal. The level of the audio signal that the output channel 953 sends out is adjusted by a master fader. The audio signal on which the signal processing has been performed is supplied to the audio I/O 103 or the network I/F 105.

The flash memory 108 has a preset memory area in which a plurality of settings (presets) of the digital signal processor 104 are stored. A preset may be called a scene or a library. The user can reproduce a setting of signal processing corresponding to the preset by selecting and recalling a desired preset among the plurality of presets stored in the flash memory 108. Such a plurality of presets may also be stored in the flash memory 108 as the setting information for each user.

Then, the audio mixer 10 according to the present embodiment receives a login from an external user, receives setting information of the external user, and controls the audio mixer 10 based on received setting information. The external user is a user that is managed by the smartphone 11, aside from the administrator, the normal user, and the guest user. The setting information of the external user is also managed by the smartphone 11.

Figure 7:
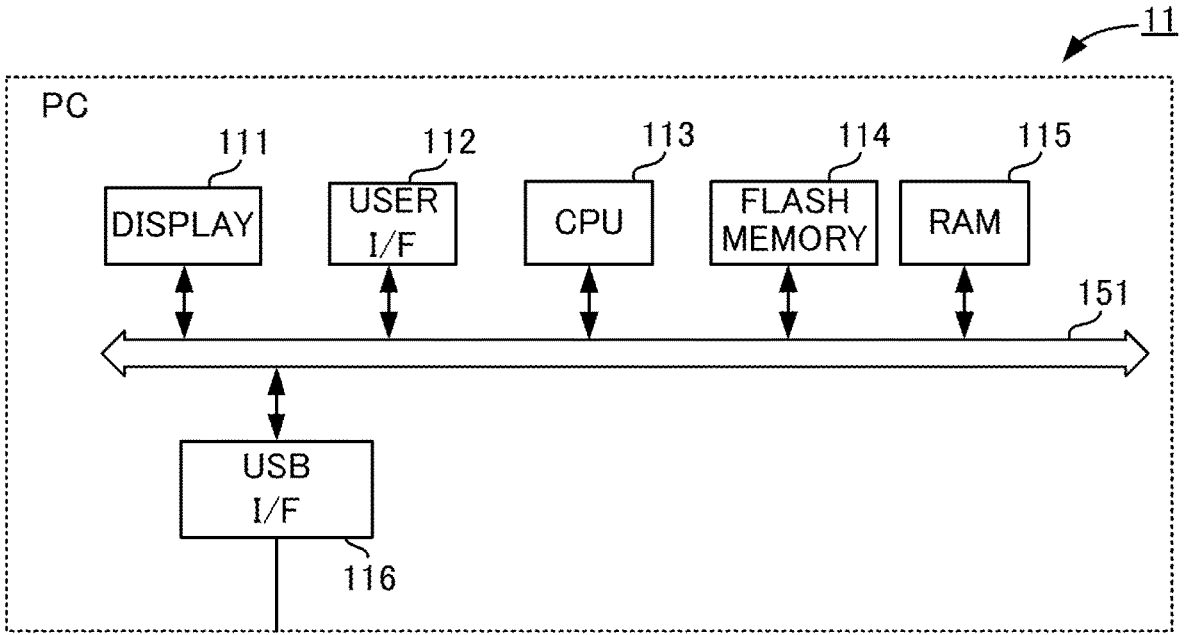
FIG. 7 is a block diagram showing a configuration of a smartphone 11.

FIG. 7 is a block diagram showing a configuration of the smartphone 11. The smartphone 11 is an example of the information processing apparatus of the present disclosure. The smartphone 11 includes a display 111, a user I/F 112, a CPU 113, a flash memory 114, a RAM 115, and a USB I/F 116. These components are connected to each other through a bus 151.

In the present embodiment, the smartphone 11 is connected to the audio mixer 10 through the USB I/F 116. However, the smartphone 11 may be connected to the audio mixer 10 by a wireless network such as Wi-Fi (registered trademark) or Bluetooth (registered trademark).

The display 111 includes an LCD or an OLED, for example, and displays various types of information according to the control of the CPU 113. The user I/F 112 includes a touch panel stacked on the display 111, and receives an operation from a user. The user I/F 112 together with the display 111 configures a GUI.

The CPU 113 reads out a program stored in the flash memory 114 being a storage medium to the RAM 115 and implements a predetermined function. For example, the CPU 113 reads and executes an application program for logging in to the audio mixer 10 with an external user account, from the flash memory 114.

Figure 8:
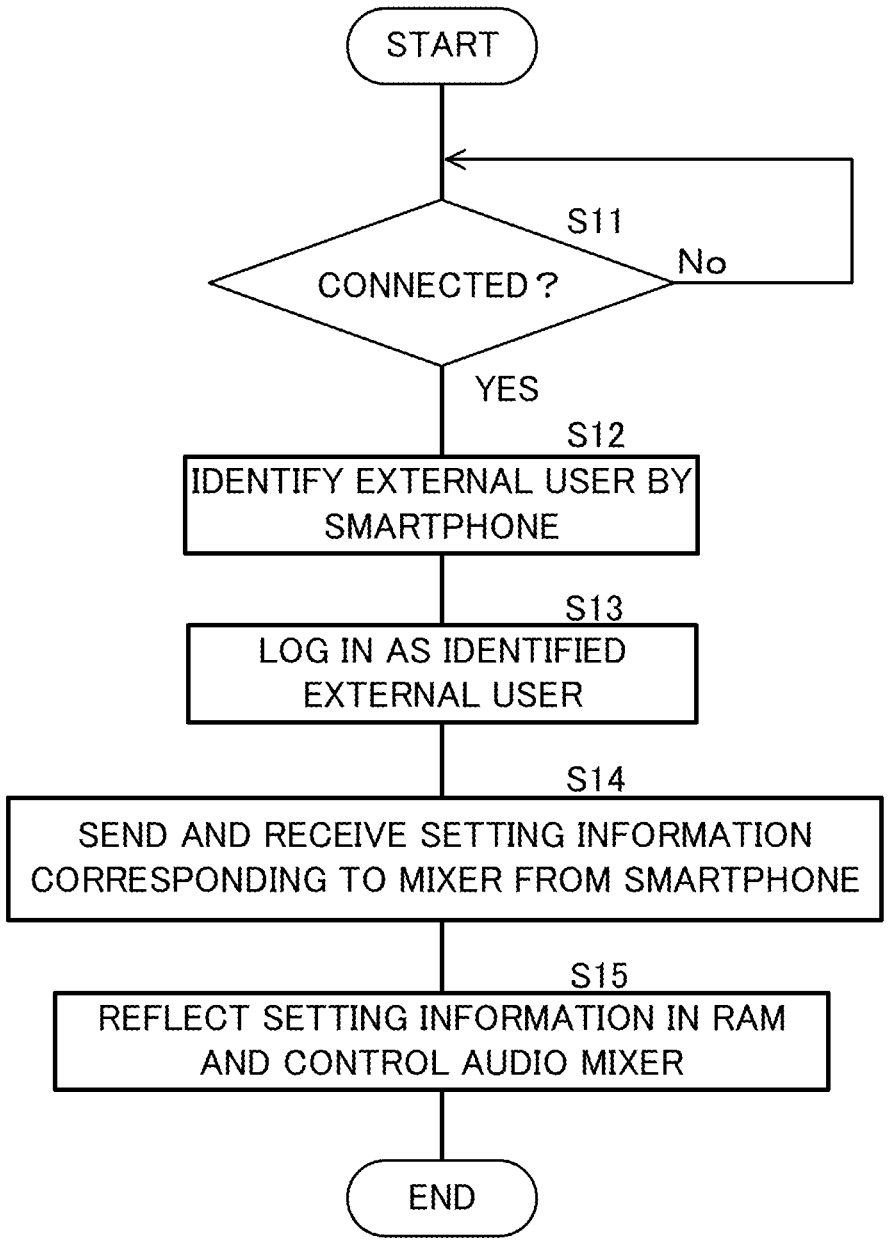
FIG. 8 is a flow chart showing an operation of the sound processing system.

FIG. 8 is a flow chart showing an operation of the sound processing system 1. First, the application programs of the audio mixer 10 and the smartphone 11 mutually check connection (S11). When the connection is completed (S11: Yes), the application program of the smartphone 11 identifies an external user by an input of a user ID and a password (S12). Alternatively, the identification of an external user may be performed by biometrics such as a fingerprint, an iris, or a face, by use of various sensors of the smartphone 11.

As described above, the external user is a user corresponding to a user ID different from the user ID of the administrator and the normal user that are managed by the audio mixer 10. The external user stores a preference setting, a setting of a user-defined knob, a setting of a user-defined key, and a setting of a custom fader bank that have been set in the past by an audio device (an audio mixer) different from the audio mixer 10, in the flash memory 114 of the smartphone 11. Alternatively, the setting information of the external user may be stored in a storage of a (not-shown) server.

The CPU 107 of the audio mixer 10 allows an external user identified by the smartphone 11 to log in (S13). The CPU 107 of the audio mixer 10 receives the setting information corresponding to a logged-in external user, from the smartphone 11 (S14). In a case in which the setting information of an external user is stored in the (not-shown) server, the smartphone 11 first receives the setting information from the server, and sends the setting information received from the server, to the audio mixer 10. Alternatively, the audio mixer 10 may receive information to show an access destination (such as a URL) of the server, from the smartphone 11, and may directly receive setting information from the server.

Then, the CPU 107 of the audio mixer 10 reflects received setting information in the RAM 109, and controls the audio mixer 10 (S15). The setting information includes the preference setting and the UD setting (information to designate a function to be assigned to a physical control of the audio device). In short, the setting information includes the preference setting, the setting of a user-defined knob, the setting of a user-defined key, and the setting of a custom fader bank.

As a result, the user can reflect the preference setting, the setting of a user-defined knob, the setting of a user-defined key, and the setting of a custom fader bank that have been set in the past by another audio device different from the audio mixer 10, in the audio mixer 10. Therefore, the user, even when using the audio mixer 10 for the first time, can reflect the preference setting, the setting of a user-defined knob, the setting of a user-defined key, and the setting of a custom fader bank that have been set in the past by another audio device, in the audio mixer 10. In other words, the user, by carrying the smartphone 11, can reflect a setting of each individual even when using any audio device at any venue.

(First Modification)

The administrator of the audio mixer 10 may set the audio mixer 10 so that only an approved specific external user can log in. In such a case, the audio mixer 10 previously receives an input of an ID of an external user from the administrator, and stores a received ID of the external user in the flash memory 108. The audio mixer 10 receives an ID of an external user identified by the smartphone 11, and allows the external user to log in as long as the ID matches the ID that has previously been registered by the administrator. The audio mixer 10 receives an ID of an external user identified by the smartphone 11, and allows the external user to log in as a guest user in a case in which the ID is different from the ID that has previously been registered by the administrator.

The guest user, as shown in FIG. 6, is restricted to the UD setting, the user level setting, or the like. Therefore, the audio mixer 10 is able to prevent use by an external user who is not approved by the administrator.

(Second Modification)

The audio mixer 10, in a case of being connected to a smartphone 11, logs in with the ID of an external user identified by the smartphone 11, and, in a case of logging the external user out, logs in as an administrator, a normal user, or a guest user.

In short, the user logs in to the audio mixer 10 as an administrator, a normal user, or a guest user, and can also use the setting information managed by the audio mixer 10, and, in a case of using an application program of the smartphone 11, logs in to the audio mixer 10 as an external user and can also use the setting information managed by the smartphone 11.

(Third Modification)

As described above, the setting (the presets) of the digital signal processor 104 may also be stored in the flash memory 108, as the setting information for each user. The smartphone 11 or the server may store information according to a plurality of presets of an external user as the setting information.

The CPU 107, when allowing the external user to log in, reads out the plurality of presets of the external user that are stored in the smartphone 11 or the server, to the own device. The user can recall any preset among the plurality of read presets (the plurality of presets stored in the smartphone 11 or the server).

As a result, the user, simply by logging in as an external user by using the smartphone 11, can select the preset managed by the smartphone 11 as a preset of the main body of the audio mixer 10.

(Fourth Modification)

The audio mixer 10, in a case in which communication with the application program of the smartphone 11 is interrupted, may automatically log out the external user. In a case of logging out the external user, the audio mixer 10 changes to a state of being logged in as a guest user.

As a result, the audio mixer 10 is able to prevent the setting information of an external user from being used by other users.
(Fifth Modification)

The number of external users managed by the information processing apparatus such as the smartphone 11 does not need to be one. The information processing apparatus may store an ID of each of a plurality of external users and setting information corresponding to each ID. In such a case, the information processing apparatus identifies one external user among the plurality of external users, in the above identification processing (S12).

As a result, the sound processing system of a fifth modification is able to reflect the setting information according to each user in the audio mixer 10, even when sharing one information processing apparatus by a plurality of users.
(Sixth Modification)

The CPU 107 of the audio mixer 10, in a case of receiving setting information of a model (a second model) different from a model (a first model) of the own device to be controlled, converts the setting information of the second model into setting information according to the first model of the own device.

For example, in a case in which the number of user-defined keys of the second model is eight (the user-defined keys 1 to 8), whereas the number of user-defined keys of the first model is four (the user-defined keys 1 to 4), the CPU 107 ignores a setting of the user-defined keys 5 to 8.

In addition, the setting information includes a preset according to signal processing, as described above. Hypothetically, in a case in which a preset of the first model includes a parameter of two stereo (a stereo A and a stereo B) output channels and the second model includes only one stereo output channel, the CPU 107 causes either one of the stereo A output channel or the stereo B output channel to correspond to a stereo channel, and causes the other to correspond to a monaural channel.

As a result, the audio mixer 10 is also able to reflect the UD setting or the setting of signal processing that has been set in a different model, in the own device.

The description of the present embodiments is illustrative in all points and should not be construed to limit the present disclosure. The scope of the present disclosure is defined not by the foregoing embodiments but by the following claims. Further, the scope of the present disclosure is intended to include all modifications within the scopes of the claims and within the meanings and scopes of equivalents.

What is claimed is:

1. A method of controlling a first audio mixer configured to receive an input audio signal from a first audio device, perform signal processing on the input audio signal, and output the input audio signal on which the signal processing has been performed to a second audio device, the method comprising:

storing, in a memory of the first audio mixer, a plurality of user types in association with setting information of the first audio mixer respectively associated with each of the plurality of user types;

receiving, by the first audio mixer and from a first user of the audio mixer, a selection of a user type among the plurality of user types;

controlling the first audio mixer based on first setting information of the first audio mixer (i) respectively associated with the selected user type received from the user of the first audio mixer and (ii) stored in the memory of the first audio mixer;

identifying an external user of the first audio mixer who is different from the plurality of user types stored in the memory of the first audio mixer, the identifying being performed by communicating with an information processing apparatus carried by the external user;

receiving, by the first audio mixer from the information processing apparatus carried by the external user, second setting information, to be applied to the first audio mixer, corresponding to the identified external user and different from the first setting information of the first audio mixer stored in the memory of the first audio mixer, the second setting information to be applied to the first audio mixer being setting information of the identified external user of the first audio mixer that has been previously set by the external user on a second audio mixer different from the first audio mixer; and controlling the first audio mixer based on the received second setting information, to be applied to the first audio mixer, corresponding to the identified external user of the first audio mixer, wherein the second setting information includes at least one of a user-defined knob setting, a user-defined key setting, or a custom fader bank setting that assigns a user-selected function to a physical control of the second audio mixer, and wherein, based on the received second setting information, the first audio mixer is controlled such that the user-selected function assigned by the second audio mixer is replicated on the first audio mixer.

2. The method of controlling the first audio mixer according to claim 1, wherein the first audio mixer receives the second setting information to be applied to the first audio mixer from a server connected to the information processing apparatus carried by the external user.

3. The method of controlling the first audio mixer according to claim 2, wherein the first audio mixer receives the second setting information to be applied to the first audio mixer from the server through the information processing apparatus carried by the external user, which (i) first receives the second setting information to be applied to the first audio mixer from the server and (ii) then sends the second setting information to be applied to the first audio mixer received from the server to the first audio mixer.

4. The method of controlling the first audio mixer according to claim 1, wherein:

the identified external user is one external user among a plurality of external users; and the second setting information to be applied to the first audio mixer is received from among a plurality of setting information to be applied to the first audio mixer, corresponding to each of the plurality of external users.

5. The method of controlling the first audio mixer according to claim 1, wherein:

the second setting information to be applied to the first audio mixer includes a parameter of the signal processing; and controlling the first audio mixer based on the received second setting information to be applied to the first audio mixer includes performing, by the first audio mixer, the signal processing on the input audio signal, received by the first audio mixer, based on the parameter of the signal processing.

6. The method of controlling the first audio mixer according to claim 1, further comprising, in a case where the second audio mixer is a model different from a model of the first audio mixer, converting the second setting information into setting information corresponding to the first audio mixer, wherein the first audio mixer is controlled based on the converted second setting information.

7. The method of controlling the first audio mixer according to claim 1, wherein the external user of the first audio mixer is identifiable by the information processing apparatus according to information stored in the information processing apparatus.

8. The method of controlling the first audio mixer according to claim 1, wherein the receiving, by the first audio mixer and from the user of the first audio mixer, the selection of the user type among the plurality of user types comprises receiving the selection of the user type among the plurality of user types via a screen of the first audio mixer.

9. An audio mixer configured to receive an input audio signal from a first audio device, perform signal processing on the input audio signal, and output the input audio signal on which the signal processing has been performed to a second audio device, the audio mixer comprising:

a processor; and a storage that stores executable instructions, wherein the processor, by executing the executable instructions, causes the audio mixer to:

store, in a memory of the audio mixer, a plurality of user types in association with setting information of the audio mixer respectively associated with each of the plurality of user types;

receive, by the audio mixer and from a user of the audio mixer, a selection of a user type among the plurality of user types;

control the audio mixer based on first setting information of the audio mixer (i) respectively associated with the selected user type received from the user of the audio mixer and (ii) stored in the memory of the audio mixer;

identify an external user of the audio mixer who is different from the plurality of user types stored in the memory of the audio mixer, the identifying being performed by communicating with an information processing apparatus carried by the external user;

receive, from the information processing apparatus carried by the external user, second setting information, to be applied to the audio mixer, corresponding to the identified external user and different from the first setting information of the audio mixer stored in the memory of first audio mixer, the second setting information to be applied to the audio mixer being setting information of the identified external user of the first audio mixer that has been previously set by the external user on another audio mixer different from the audio mixer; and control the audio mixer based on the received second setting information, to be applied to the audio mixer, corresponding to the identified external user of the audio mixer, wherein the second setting information includes at least one of a user-defined knob setting, a user-defined key setting, or a custom fader bank setting that assigns a user-selected function to a physical control of the another audio mixer, and wherein, based on the received second setting information, the audio mixer is controlled such that the user-selected function assigned by the another audio mixer is replicated on the audio mixer.

10. The audio mixer according to claim 9, wherein the audio mixer receives the second setting information to be applied to the audio mixer from a server connected to the information processing apparatus carried by the external user.

11. The audio mixer according to claim 10, wherein the audio mixer receives the second setting information of to be applied to the audio mixer from the server through the information processing apparatus carried by the external user, which (i) first receives the second setting information to be applied to the audio mixer from the server and (ii) then sends the second setting information to be applied to the audio mixer received from the server to the audio mixer.

12. The audio mixer according to claim 9, wherein:

the identified external user is one external user among a plurality of external users; and the second setting information to be applied to the audio mixer is received from among a plurality of setting information to be applied to the audio mixer, corresponding to each of the plurality of external users.

13. The audio mixer according to claim 9, wherein:

the second setting information to be applied to the audio mixer includes a parameter of the signal processing; and the processor causes the audio mixer to control the audio mixer based on the received second setting information such that the audio mixer performs the signal processing on the input audio signal, received by the audio mixer, based on the parameter of the signal processing.

14. The audio mixer according to claim 9, wherein the processor, in a case where the another audio mixer is a model different from a model of the audio mixer, converts the second setting information into setting information corresponding to the audio mixer, and wherein the audio mixer is controlled based on the converted second setting information.

15. The audio mixer according to claim 9, wherein the external user of the first audio mixer is identifiable by the information processing apparatus according to information stored in the information processing apparatus.

16. A sound processing system comprising:

a first audio mixer configured to receive an input audio signal from a first audio device, perform signal processing on the input audio signal, and output the input audio signal on which the signal processing has been performed to a second audio device, the first audio mixer being further configured to:

store, in a memory of the first audio mixer, a plurality of user types in association with setting information of the first audio mixer respectively associated with each of the plurality of user types;

receive, by the first audio mixer and from a user of the first audio mixer, a selection of a user type among the plurality of user types; and control the first audio mixer based on first setting information of the first audio mixer (i) respectively associated with the selected user type received from the user of the first audio mixer and (ii) stored in the memory of the first audio mixer; and an information processing apparatus carried by an external user and configured to communicate with the first audio mixer, wherein:

the information processing apparatus is configured to identify the external user, who is different from the plurality of user types stored in the memory of the first audio mixer, by executing an application program, and to send second setting information to be applied to the first audio mixer, corresponding to the identified external user and different from the first setting information of the first audio mixer stored in 5 the memory of the first audio mixer, to the first audio mixer;

the first audio mixer is configured to receive the second setting information to be applied to the first audio mixer, corresponding to the identified external user, 10 from the information processing apparatus and to control the first audio mixer based on the received second setting information of to be applied to the first audio mixer;

the second setting information to be applied to the first 15 audio mixer is setting information of the identified external user of the first audio mixer that has been previously set by the external user on a second audio mixer different from the first audio mixer;

wherein the second setting information includes at least 20 one of a user-defined knob setting, a user-defined key setting, or a custom fader bank setting that assigns a user-selected function to a physical control of the second audio mixer; and wherein, based on the received second setting information, 25 the first audio mixer is controlled such that the user-selected function assigned by the second audio mixer is replicated on the first audio mixer.

\* \* \* \* \*